United States Patent [19]
Morelli

[11] Patent Number: 5,838,720
[45] Date of Patent: Nov. 17, 1998

[54] TRANSCEIVER CONTROL WITH SLEEP MODE OPERATION

[75] Inventor: Daniel J. Morelli, Norton, Ohio

[73] Assignee: Teletransactions, Inc., Akron, Ohio

[21] Appl. No.: 605,914

[22] Filed: Feb. 23, 1996

[51] Int. Cl.⁶ .............. H04B 1/38; H04B 7/00; H04B 1/16; H04L 5/16
[52] U.S. Cl. .......... 375/219; 375/219; 375/222; 455/38.2; 455/38.3; 455/343
[58] Field of Search ............ 375/219; 455/38.2, 455/38.3, 38.1, 343

[56] References Cited

U.S. PATENT DOCUMENTS

| | | |
|---|---|---|
| 4,577,315 | 3/1986 | Otsuka ........................ 370/95 |
| 4,903,319 | 2/1990 | Kasai et al. . |
| 4,955,038 | 9/1990 | Lee et al. . |
| 5,029,183 | 7/1991 | Tymes . |
| 5,103,461 | 4/1992 | Tymes . |
| 5,142,550 | 8/1992 | Tymes . |
| 5,157,687 | 10/1992 | Tymes . |
| 5,179,724 | 1/1993 | Lindoff . |
| 5,220,564 | 6/1993 | Tuch et al. . |
| 5,265,270 | 11/1993 | Stengel et al. . |
| 5,276,680 | 1/1994 | Messenger . |
| 5,280,498 | 1/1994 | Tymes et al. . |
| 5,471,655 | 11/1995 | Kivari . |
| 5,479,441 | 12/1995 | Tymes et al. . |
| 5,519,506 | 5/1996 | D'Avello et al. ................ 358/400 |
| 5,524,021 | 6/1996 | Scotton et al. ................ 375/222 |
| 5,559,804 | 9/1996 | Amada et al. ................ 370/95.3 |
| 5,566,366 | 10/1996 | Russo et al. . |

*Primary Examiner*—Stephen Chin
*Assistant Examiner*—Michael W. Maddox
*Attorney, Agent, or Firm*—Renner, Otto, Boisselle & Sklar, P.L.L.

[57] ABSTRACT

A transceiver which begins to power up the transmitter as soon as it is determined that a packet being received requires a response. A control circuit within the transceiver processes the packet as it is received to determine whether the packet requires a response. If it is determined that a response is necessary, the control circuit provides a control signal to the transmitter to power up the transmitter from a sleep mode even before the entire packet has been received and processed. The control circuit then continues to process the remainder of the packet as it is received while the transmitter powers up from the sleep mode. In this manner, the transmitter will become stabilized much earlier. Accordingly, the transceiver is able to respond more quickly than conventional devices and is thus able to increase response times and overall data exchange rates. Moreover, battery power of the transceiver is utilized more efficiently compared to devices which must continuously maintain the transmitter in a fully powered mode.

13 Claims, 8 Drawing Sheets

TRANSCEIVER CONTROL WITH SLEEP MODE OPERATION

TECHNICAL FIELD

The present invention relates generally to wireless communication devices, and more particularly to transceivers having transmitters which switch between a high power consumption mode and a low power consumption (or "sleep") mode.

BACKGROUND OF THE INVENTION

In recent years, the use of wireless communication systems having mobile transceivers which communicate with a hardwired network, such as a local area network (LAN) or a wide area network (WAN), has become widespread. The mobile transceivers, commonly referred to as mobile terminals, may take one of several different forms. For instance, in retail stores hand-held scanning units may be used to allow for scanning inventory bar codes. In a warehouse, portable units mounted to a vehicle may be used to gather information from the warehouse floor. In a medical environment, the mobile terminal may take the form of a pen based workslate which allows medical personnel to work with full page screens at once.

In a typical wireless communication system, each mobile terminal communicates with a networked system via a radio or optical link in order to allow for a real time exchange of information. The mobile terminals communicate through one of several base stations interconnected to the network. The base stations allow for a wireless data communication path to be formed.

Each mobile terminal and base station communicate via their respective transmitter and receiver (i.e., transceiver) systems. Typically, the transmitter and receiver in each device share the same antenna; and a control signal is used to switch the antenna between transmitting and receiving mode. Thus, only one of the transmitter or receiver needs to be active at any given time.

Information exchanged between mobile terminals and base stations is generally sent in packet format. Packets of information (also referred to herein simply as "packets" or "data packets") are a defined set of data bits which carry information such as source address, destination address, synchronization bits, data, error correcting codes, etc.

In order to provide for an efficient operating system, access to a channel is expeditiously controlled by a media access protocol. For example, a typical media access protocol may provide that if a device receives a packet which requires a response, transmission of the response must be initiated within a time period on the order of 15 microseconds after receiving the entire original packet. This time span, or slot time, is referred to as the short inter-frame space (SIFS). The purpose of the 15 µs SIFS is twofold. First, it speeds up data exchange between devices by limiting the amount of time a device can take to respond. Secondly, it limits the amount of time a device receiving the response must remain in the receiving mode. As mentioned above, since the transmitter and receiver oftentimes are connected to the same antenna, a device may miss information if it is transmitting information at the same time it could be receiving information.

During such time when a device is receiving information but not transmitting information, a fully powered transmitter can nevertheless consume a considerable amount of power. In order to conserve power in the above mentioned mobile terminals, for example, the transmitter and perhaps other non-essential circuitry is generally placed into a sleep-like state, referred to herein as a "sleep mode", during periods where the system is receiving information. During the sleep mode, the power provided to the transmitter and other non-essential circuitry is reduced to minimum levels. Since most mobile terminals operate on battery power, the sleep mode helps maintain a longer usable battery life without the need for recharging or replacing the battery.

An unfortunate consequence of placing a device's transmitter into a sleep mode is that the data exchange rate will be reduced. This is because it takes time for the transmitter to stabilize into a fully powered state after a signal is sent to the transmitter indicating that it needs to transmit information. For instance, it is common for transmitter circuitry to take approximately two-thirds of the allowed SIFS time to stabilize. During this time, information is neither being transmitted or received by the responding device. As a consequence, overall data exchange rate suffers. Further, given the strict SIFS time limitations typically in place, it is difficult for the transmitter to respond to a packet during the short period of SIFS time remaining after the transmitter has stabilized. Systems attempting to meet these SIFS times typically have higher possibilities of errors occurring in each transmission. In addition, as higher spectral density modulation techniques are implemented (typically to increase data rate), more complex transmitter circuitry is utilized which requires even longer stabilization time. Thus, even greater possibilities of transmission errors or slower data exchange rates exist.

In view of the aforementioned shortcomings in existing transceivers due to the time limitations for responding to an information packet and due to the desire for higher data rates, there is a strong need in the art for a transceiver which does not suffer from such drawbacks. There is a strong need for a transceiver in which the switching of the transmitter between an active mode and a sleep mode allows for sufficient time to respond to packets within a prescribed response period, even at high data rates in which the system may be operating. More specifically, there is a strong need in the art for a transceiver and system which is not burdened by delays caused by waiting for the transmitter to fully stabilize upon awakening from a sleep mode.

SUMMARY OF THE INVENTION

The present invention relates to a transceiver which begins to power up the transmitter as soon as it is determined that a packet being received requires a response. A control circuit within the transceiver processes the packet as it is received to determine whether the packet requires a response. If it is determined that a response is necessary, the control circuit provides a control signal to the transmitter to power up the transmitter from a sleep mode even before the entire packet has been received. The control circuit then continues to process the remainder of the packet as it is received while the transmitter powers up from the sleep mode. In this manner, the transmitter will become stabilized much earlier. Accordingly, the transceiver is able to respond more quickly than conventional devices and is thus able to increase response times and overall data exchange rates. Moreover, battery power of the transceiver is utilized more efficiently as compared to devices which must continuously maintain the transmitter in a fully powered mode.

According to one particular aspect of the invention, a transceiver system is provided which includes: a receiver portion for receiving a packet of information, the packet comprising indicia for indicating whether the packet is to be responded to, and the indicia preceding at least one of control information and data also included in the packet; a transmitter portion for transmitting information, the transmitter portion being switchable, based on a control input, between a low power consumption mode and an active mode during which information is transmitted; and a control circuit coupled to the receiver portion for processing the packet received by the receiver portion to determine whether the packet is to be responded to wherein, prior to the receiver portion receiving the entire packet, the control circuit evaluates the indicia and provides the control input to the transmitter portion to initiate a switch of the transmitter portion from the low power consumption mode to the active mode in the event the packet is to be responded to.

According to another aspect of the invention, a method is provided for controlling a transceiver apparatus having a receiver portion for receiving a packet of information, and a transmitter portion for transmitting information, the transmitter portion being switchable, based on a control input, between a low power consumption mode and an active mode during which information is transmitted, the packet comprising indicia for indicating whether the packet is to be responded to, and the indicia preceding at least one of control information and data also included in the packet, the method comprising the steps of: receiving the packet via the receiver portion; and processing the packet received by the receiver portion by evaluating the indicia and providing the control input to the transmitter portion prior to the receiver portion receiving the entire packet to initiate a switching of the transmitter portion from the low power consumption mode to the active mode in the event the packet is to be responded to.

In accordance with another aspect of the invention, a transceiver system is provided which includes: a receiver for receiving a data packet; a transmitter for transmitting information in response to the data packet; and a control circuit coupled to the receiver for processing the data packet to determine whether it is necessary for the radio transceiver to respond to the data packet, and for providing a control signal to the transmitter prior to the receiver receiving the entire data packet if it is determined that a response is needed.

According to still another aspect of the invention, a method of controlling power to circuitry associated with a radio transmitter is provided, comprising the steps of: receiving a data packet; determining whether a response is needed to the data packet prior to receiving the entire data packet; and sending a signal to the circuitry associated with a radio transmitter prior to receiving the entire data packet if it is determined that a response is needed.

In accordance with still another aspect, a transceiver system is provided which includes: an antenna switchable between a receive position and a transmit position; a receiver portion for receiving a packet of information via the antenna when the antenna is in the receive position, the packet comprising indicia for indicating whether the packet is to be responded to, and the indicia preceding at least one of control information and data also included in the packet; a transmitter portion for transmitting information via the antenna when the antenna is in the transmit position, the transmitter portion being switchable, based on a control input, between a low power consumption mode and an active mode during which information is transmitted; and a control circuit coupled to the receiver portion for processing the packet received by the receiver portion to determine whether the packet is to be responded to wherein, prior to providing a control signal to the antenna to switch the antenna from the receive position to the transmit position, the control circuit evaluates the indicia and provides the control input to the transmitter portion to initiate a switch of the transmitter portion from the low power consumption mode to the active mode in the event the packet is to be responded to.

According to yet another aspect, a method is provided for controlling a transceiver system having an antenna switchable between a receive position and a transmit position, a receiver portion for receiving a packet of information via the antenna when the antenna is in the receive position, and a transmitter portion for transmitting information via the antenna when the antenna is in the transmit position, the transmitter portion being switchable, based on a control input, between a low power consumption mode and an active mode during which information is transmitted, the packet comprising indicia for indicating whether the packet is to be responded to, and the indicia preceding at least one of control information and data also included in the packet, the method comprising the steps of: receiving the packet via the receiver portion; and processing the packet by evaluating the indicia and providing the control input to the transmitter portion prior to providing a control signal to the antenna to switch the antenna from the receive position to the transmit position to initiate a switching of the transmitter portion from the low power consumption mode to the active mode in the event the packet is to be responded to.

In accordance with but another aspect, a cellular communication system is provided including a network; a host computer coupled to the network; a plurality of base stations coupled to the network and communicating with the host computer, each of the base stations comprising a base station transceiver for transmitting and receiving wireless communications; and a plurality of mobile terminals each for communicating with the network by way of at least one of the plurality of base stations, each of the plurality of mobile terminals having a mobile terminal transceiver for transmitting and receiving wireless communications with respect to the at least one of the plurality of base stations; wherein the transceiver of at least one of the mobile terminals or base stations comprises: a receiver portion for receiving a packet of information, the packet comprising indicia for indicating whether the packet is to be responded to, and the indicia preceding at least one of control information and data also included in the packet; a transmitter portion for transmitting information, the transmitter portion being switchable, based on a control input, between a low power consumption mode and an active mode during which information is transmitted; and a control circuit coupled to the receiver portion for processing the packet received by the receiver portion to determine whether the packet is to be responded to wherein, prior to the receiver portion receiving the entire packet, the control circuit evaluates the indicia and provides the control input to the transmitter portion to initiate a switch of the transmitter portion from the low power consumption mode to the active mode in the event the packet is to be responded to.

In accordance with still another apect, a transceiver apparatus is provided including: a receiver portion for receiving a packet of information; a transmitter portion for transmitting information, the transmitter portion being switchable, based on a control input, between a low power consumption mode and an active mode during which information is transmitted; and a control circuit coupled to the receiver portion for processing the packet received by the receiver portion, wherein prior to the receiver portion receiving the entire packet, the control circuit provides a control input to the transmitter portion to initiate a switch of the transmitter portion from the low power consumption mode to the active mode.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
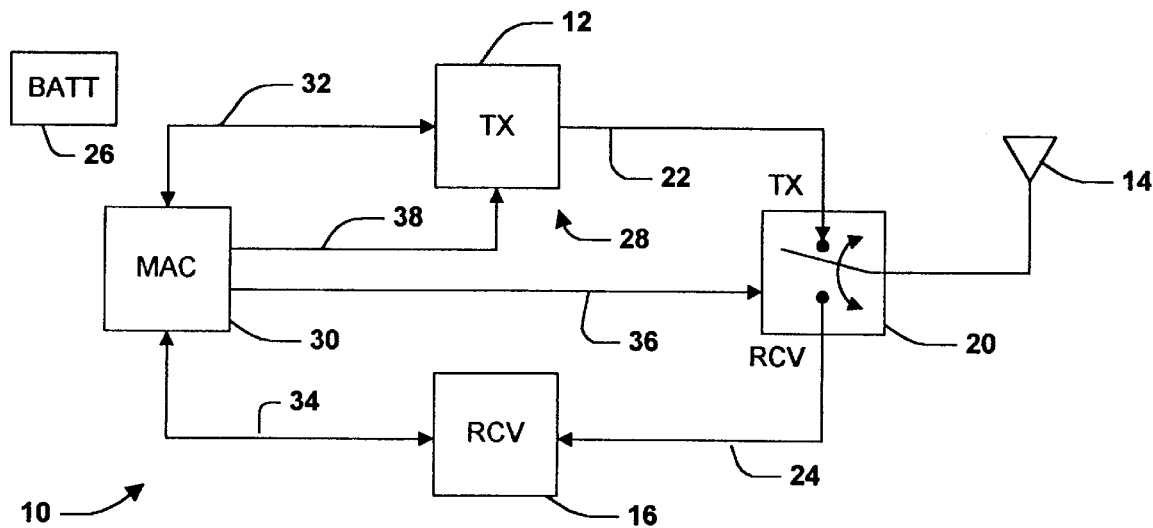
FIG. 1 is a block diagram of a transceiver having a transmitter which is switchable between a low power consumption mode and an active mode in accordance with the present invention.

The present invention will now be described with reference to the drawings in which like reference numerals are used to refer to like elements throughout.

Referring initially to FIG. 1, a transceiver in accordance with the present invention is generally designated 10. The transceiver 10 includes a radio transmitter 12 for transmitting radio signals via an antenna 14. In addition, the transceiver 10 includes a radio receiver 16 for receiving radio signals via the antenna 14. An antenna switch 20 allows the transceiver 10 to transmit or receive signals depending on the position of the switch. When the switch 20 is in the transmit (TX) position, the antenna 14 is coupled to the output of the transmitter 12 via line 22 so that the transmitter 12 can transmit information. Alternatively, when the switch 20 is in the receive (RCV) position the antenna 14 is coupled to the input of the receiver 16 by way of line 24. The receiver 16 thereby receives information via the antenna 14.

In the exemplary embodiments described herein, the transmitter 12 and receiver 16 are of conventional design. In particular, the transmitter 12 and receiver 16 are designed to transmit and receive, respectively, digital information modulated onto a radio frequency (rf) carrier. As is described more fully below in connection with FIG. 2, the digital information is transmitted and received in the form of packets. The transmitter 12 is of the type which can be selectively switched between a low power consumption mode (i.e., a sleep mode) and an active mode as discussed above. More specifically, when the transmitter 12 is in the sleep mode, the supply of power to the power amplifier (not shown), modulation circuitry (not shown), and/or various other power consuming components within the transmitter 12 is cut off or otherwise reduced. In this manner, the load on a battery 26 used to power the transceiver 10 is reduced. The transmitter 12 is selectively switched between the sleep mode and active mode based on a control signal provided to a sleep/active input 28.

The transceiver 10 further includes a control circuit 30 which processes the information which is communicated via the transceiver 10. In the preferred embodiment, the control circuit 30 is made up of a medium access controller (MAC) which is connected to the transmitter 12 and receiver 16 by way of lines 32 and 34, respectively. The MAC 30 provides a RCV/TX control signal on line 36 to the antenna switch 20 in order to selectively switch the antenna switch 20 between the transmit and receive positions. Moreover, the MAC 30 provides a sleep/active control signal on line 38 to the input 28 in order to selectively switch the transmitter 12 between the sleep and active modes.

The MAC 30 preferably includes a series of state machines which process incoming data packets received by the receiver 16 in order to determine which packets being received require a response. In the event a packet requires a response, the MAC 30 provides a control signal on line 38 to switch the transmitter 12 from a sleep mode to an active mode. In addition, the MAC 30 provides a control signal on line 36 to switch the antenna switch 20 from the receive position to the transmit position. Thereafter, the transmitter 12 can transmit an appropriate response. When the transmitter 12 is not being used, the MAC 30 provides a control signal on line 38 to switch the transmitter 12 back to the sleep mode in order to allow the transceiver 10 to conserve battery power. In addition, the MAC 30 switches the antenna switch 20 back to the receive position in order to receive the next packet.

The MAC 30 differs from conventional medium access controllers operating in a power savings mode in that it does not wait until the entire packet has been received by the receiver 16 before providing a control signal on line 38. Rather, as a packet of information is received by the transceiver 10 via the receiver 16, the MAC 30 processes the packet in order to determine if a response is necessary. The MAC 30 receives the packet from the receiver 16 via line 34 as the packet is received. As is explained more fully below, the MAC 30 evaluates the contents of a type/address field (FIG. 2) included in the packet, such field containing information regarding the type of packet which has been received. More specifically, the MAC 30 evaluates the field for the presence of some type of indicia as to whether the packet is of the type that requires a response or is of the type which does not require a response. In the event the MAC 30 determines that an incoming packet does require a response, the MAC 30 can immediately provide the sleep/active control signal on line 38 so as to initiate the powering up of the transmitter 12 from the sleep mode to the active mode.

Thus, during such time as the receiver 16 continues to receive the remainder of the packet which is then processed by the MAC 30 in a conventional manner, the transmitter 12 can be transitioning from the sleep mode to a stable active mode. The transmitter 12 can therefore be in a stable state either by the time the entire packet has been received and processed or shortly thereafter. In this manner, all or the majority of the SIFS time slot is available for responding to the packet as will be more fully appreciated based on the description presented below. Consequently, a high transceiver data exchange rate may be maintained with minimal concern for transmitter circuitry stabilization time. Thus, even when utilizing complex transmitter circuitry requiring a long stabilization time, as is typically needed to support high data rates, an optimal data exchange rate can still be achieved.

Figure 2:
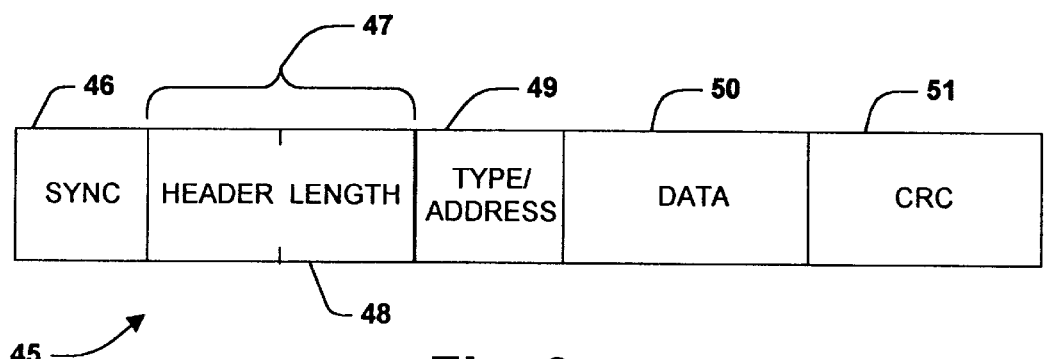
FIG. 2 is a schematic representation of a packet format in accordance with the present invention.

FIG. 2 shows the format of an exemplary data packet 45 received by the transceiver 10 of FIG. 1. As is conventional, the data packet 45 is represented by a sequence of data and/or control information which is segmented into respective fields. The data packet 45 together with the information contained therein is constructed by the device which subsequently transmits the packet 45 to the transceiver 10. The format of the data packet 45 will typically be governed by the system protocol as is conventional. The data packet 45 includes, in order, a synchronization field 46 including synchronizing bits for synchronizing the receiver 16; a header field 47 including header information such as the source address of the data packet, the header field 47 including at the end thereof a length field 48 including information regarding the length of the packet (e.g., number of bits); a type/address field 49; a data field 50; and a cyclic redundancy check (CRC) field 51. It is noted that the length of the respective fields as shown in FIG. 2 as well as the other figures herein are not necessarily shown in proper corresponding proportion. In many cases the length of some fields has been exaggerated in the drawings for ease of understanding.

The type/address field 49 includes the destination address of the packet 45 and information indicating whether or not the packet is of a type which requires a response. For example, the type/address field 49 can include one or more bits which are set to indicate that the transceiver 10 is required to transmit a positive and/or negative acknowledgment of receipt of the packet 45. In addition or in the alternative, the type/address field 49 can include information which identifies the packet as a type which needs to be processed and transmitted by the transceiver 10 in order to forward the information to another location. Regardless of the particular reason why the packet 45 may necessitate a response, the type/address field 49 has one or more predetermined indicia therein for indicating whether the packet 45 is of a type which requires that the transceiver 10 respond by transmitting information or is of a type which does not require that the transceiver 10 respond by transmitting information. The type/address field 49 is shown located approximately in the middle of the data packet 45, although it will be appreciated that the type/address field 49 could be located elsewhere in the packet. In the preferred embodiment, however, the type/address field 49 is located within the initial half of the data packet 45 and most preferably towards the front of the packet 45.

Following the type/address field 49, the data packet 45 includes a data field 50 which contains the primary data being sent within the packet. The data field 50 is then followed by a cyclic redundancy check (CRC) field 51 which includes a CRC code for error detection as is conventional.

Figure 3A:
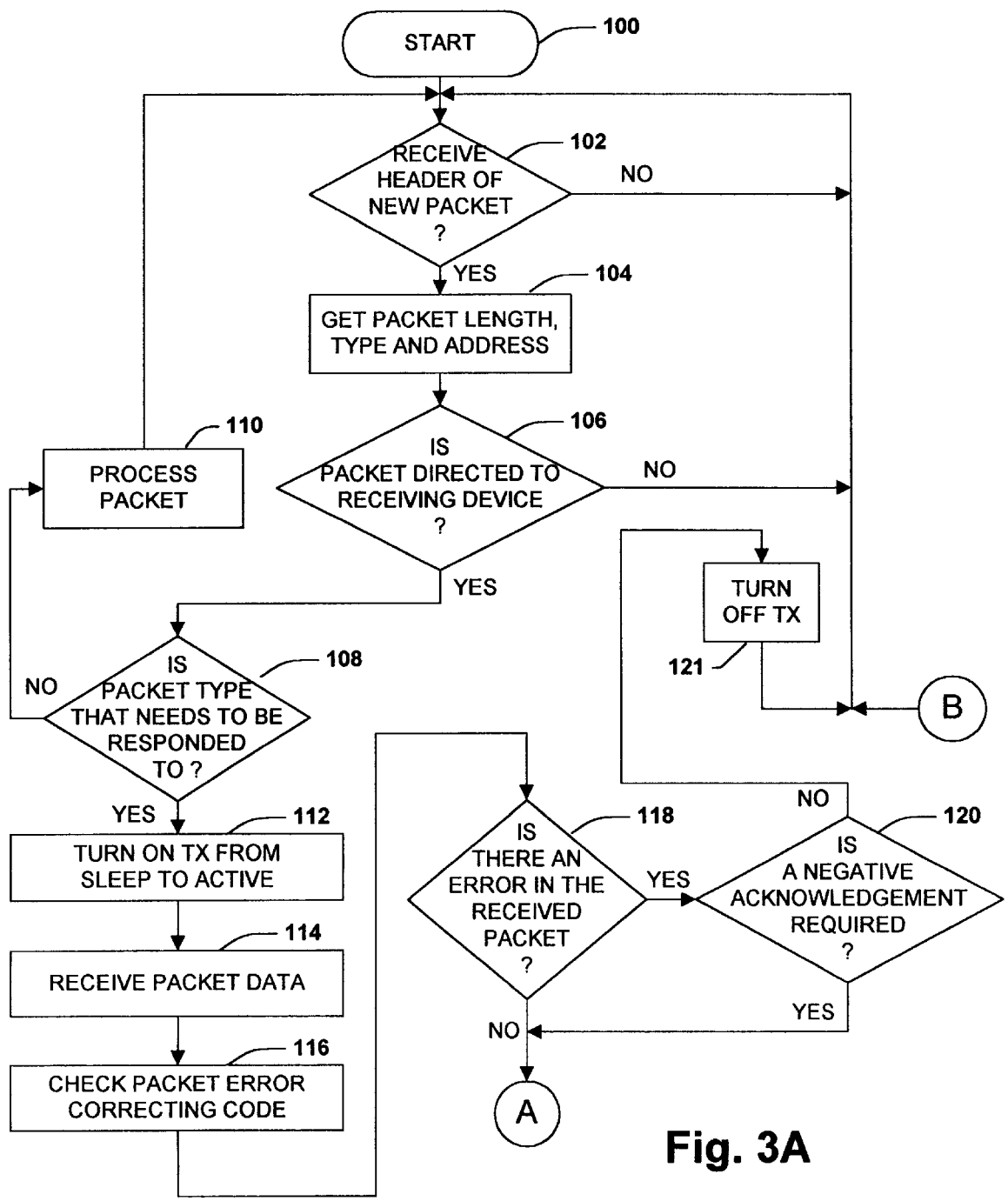
FIGS. 3A and 3B form a flowchart representing the operation of the transceiver control circuit in accordance with a first embodiment of the present invention.
Figure 3B:
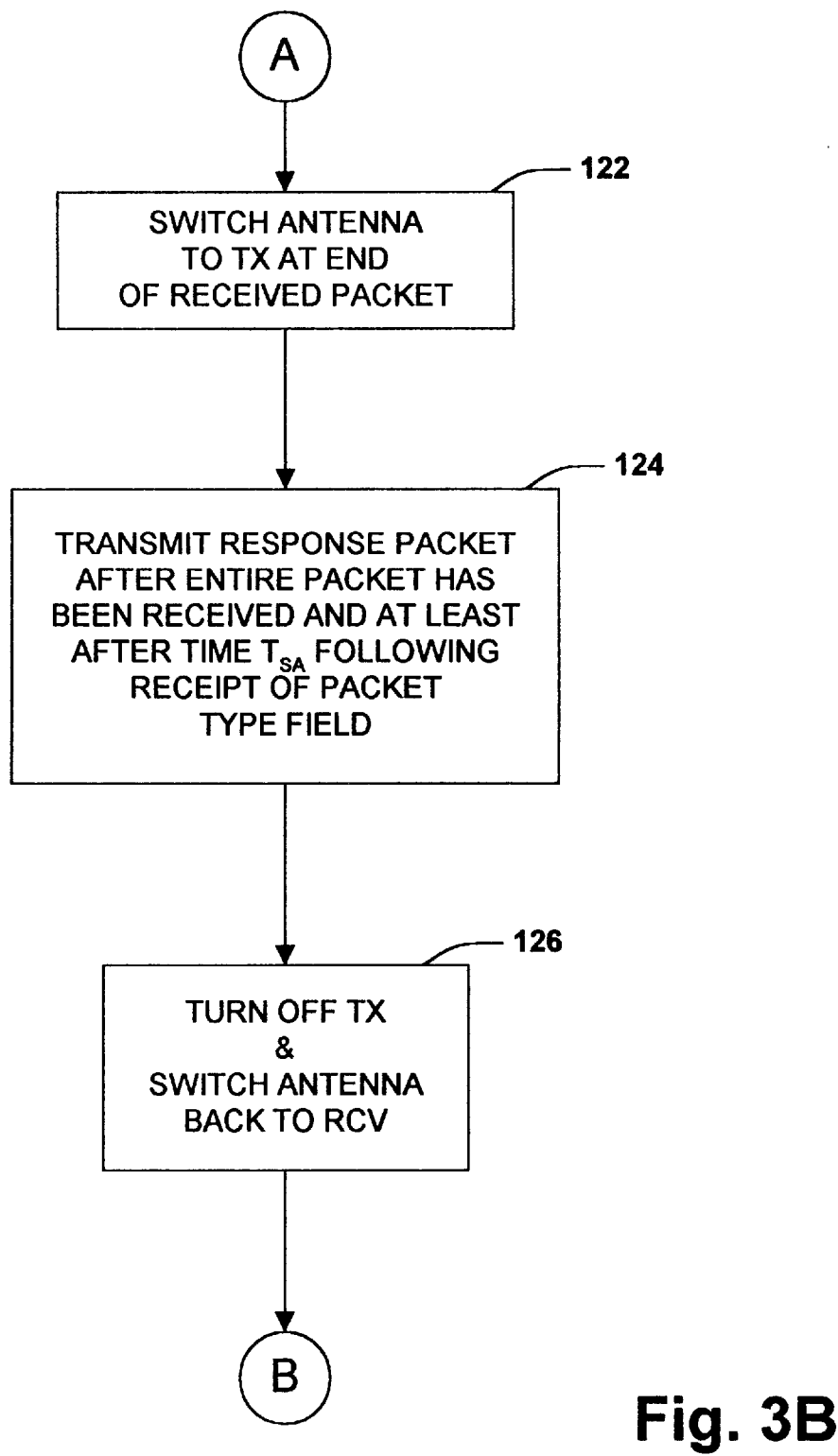

Referring now to FIGS. 3A and 3B, a flowchart showing the sequence of operation of the MAC 30 is shown in connection with a first embodiment of the invention. Beginning in block 100, the MAC 30 together with the remainder of the transceiver 10 is initialized upon being powered up via an ON/OFF switch, for example. As noted above, during such time as the transmitter 12 is not transmitting information, the transmitter 12 as controlled by the MAC 30 is normally in a sleep mode and the antenna switch 20 is in the receive position. The receiver 16 receives any incoming packets, and as a given packet 45 is being received, the receiver 16 provides the packet 45 in sequence to the MAC 30. In block 102, the MAC 30 determines whether header information belonging to a new packet as found in header field 47 (FIG. 2) has been received via the receiver 16. If no, the MAC 30 remains in a loop around block 102 until such header information is received. When the MAC 30 does receive header information in block 102 so as to indicate a new packet is being received, the MAC 30 proceeds to block 104. As the receiver 16 continues to receive the incoming packet and provide it to the MAC 30, in block 104 the MAC 30 processes the length and type/address fields 48 and 49, respectively (FIG. 2). Specifically, the MAC 30 determines the length of the packet following the header field 47 based on the information in the length field 48, and determines the destination address and packet type based on the information in the type/address field 49.

Following block 104, the MAC 30 proceeds to block 106 in which the MAC 30 determines, based on the destination address, if the packet is directed to the particular transceiver 10 in which the MAC 30 resides. For example, if the destination address in field 49 is that of the particular transceiver 10, it is determined in block 106 that the packet is in fact directed to the particular transceiver 10. Alternatively, the destination address may indicate that the received packet has been broadcasted and is thus directed to and intended to be received by the particular transceiver 10. If the packet is determined to be directed to the transceiver 10, the MAC 30 proceeds to block 108. Otherwise, the packet is dismissed as being directed to another device and the MAC 30 returns to block 102 as shown in FIG. 3A.

The MAC 30 in block 108 evaluates the type information from the type/address field 49 to determine if the packet being received is of the type which requires a response. For example, the MAC 30 determines if the type/address field 49 includes indicia indicating that a receipt acknowledgment is necessary or that the transceiver 10 will be required for some other reason to transmit some type of response to the packet. If in block 108 the MAC 30 determines that the packet is not of the type which needs to be responded to, the MAC 30 proceeds directly to block 110 wherein it carries out any other processing which may be required with respect to a packet that does not necessitate a response. Thereafter, the MAC 30 returns to block 102 where it waits for another header indicating receipt of a new packet.

In the event the MAC 30 determines in block 108 that the packet being received is of the type that requires a response, however, the MAC 30 proceeds to block 112. At such time as the MAC 30 reaches block 112, the MAC 30 provides a control signal on line 38 (FIG. 1) to switch the transmitter 12 from the sleep mode to an active mode. Hence, even before the MAC 30 has processed the data field 50 and CRC field 51 (FIG. 2), the MAC 30 provides a control signal in block 112 to power up the circuitry in the transmitter 12. In this manner, extra time can be gained to allow the transmitter circuitry to stabilize prior to transmission of a response. As discussed above in the background section, typical MAC protocols only allow a total of 15 $\mu$s for the transceiver 10 to begin responding after receiving the entire packet 45. However, given that the information needed to determine whether the incoming packet needs to be responded to can be determined by the MAC 30 prior to processing of the complete packet 45, in the preferred embodiment the MAC 30 utilizes the information as soon as it is extrapolated from the packet to begin powering up the transmitter 12 to an active mode.

Following block 112, the MAC 30 receives the packet data from data field 50 (FIG. 2) via the receiver 16 for conventional processing as represented in block 114. The MAC 30 then proceeds to block 116 in which the MAC 30 checks the error correcting code in the CRC field 51 of the incoming packet. Based on the error correcting code and using conventional techniques, the MAC 30 determines in block 118 whether an error has occurred in the receipt of the packet. If an error has occurred, the MAC 30 proceeds to block 120 in which it is determined whether a negative acknowledgment of receipt is required. Specifically, the MAC 30 refers to the information from the type/address field 49 as obtained in block 104 to determine if the received packet is of the type that requires a response indicating that the received packet included an error. If it is not necessary for the transceiver 10 to acknowledge that the packet as received included errors, the MAC 30 provides a control signal on line 38 to switch the transmitter 12 back to the sleep mode, as represented in block 121, since there is no need to respond to the erroneous packet. Thereafter, the MAC 30 returns to block 102 to await the next packet header.

If a negative acknowledgment is required in block 120, or if the MAC 30 determines in block 118 that the packet was received error free, the MAC 30 proceeds to block 122. The MAC 30 in block 122 provides a control signal on line 36 (FIG. 1) in order to change the antenna switch 20 to the transmit position upon receipt of the entire packet. Following block 122, the MAC 30 sends a control signal in block 124 to the transmitter 12 via line 32 instructing to transmitter 12 to begin transmitting a response. Most often, the response will be an acknowledgment that the transceiver 10 has successfully received the packet 45.

However, the particular content of the response will depend on the particular application and is not intended to limit unnecessarily the scope of the invention as will be appreciated. The timing of the control signal provided by the MAC 30 on line 32 is designed such that the transmitter 12 will begin transmitting the response only when both (i) the entire incoming packet has been received; and (ii) at least a time Tsa has elapsed following the initiation of the powering up of the transmitter 12 in block 112, where Tsa represents the time period required for the transmitter circuitry to stabilize upon being switched from the sleep mode to the active mode. The value of Tsa will depend on the particular design of the transmitter 12, but such value can easily be determined based on routine testing and evaluation as will be appreciated.

The MAC 30 then proceeds from block 124 to block 126. In block 126, following completion of the response transmission the MAC 30 provides a control signal on line 38 to switch the transmitter 12 back to the sleep mode. In addition, the MAC 30 provides a control signal on line 36 to change the antenna switch 20 back to the receive position. Thereafter, the MAC 30 returns to block 102 to await the header of the next packet. The above-described sequence is then repeated for each packet received by the transceiver 10.

Figure 4:
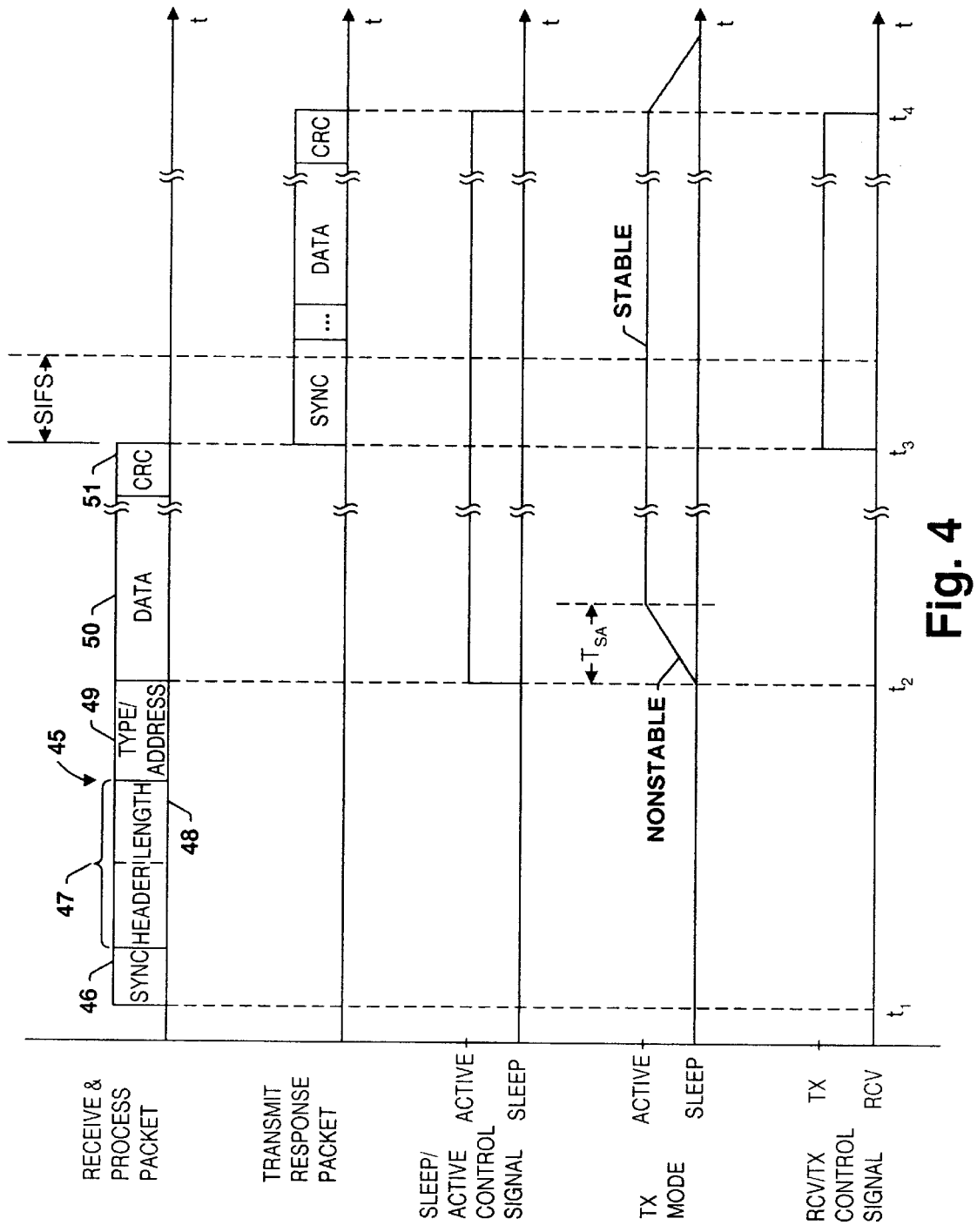
FIG. 4 is a timing diagram illustrating operation of the transceiver in accordance with the first embodiment of the present invention.

FIG. 4 is a timing diagram illustrating the operation of the MAC 30 in connection with the receipt of a packet 45 and the provision of the various control signals within the transceiver 10 as set forth in FIGS. 3A and 3B. Beginning at time t1, the receiver 16 begins receiving and the MAC 30 begins processing an incoming packet 45 (block 102). The MAC 30 as mentioned above includes a state machine capable of high speed processing of the incoming packet. Hence, as far as the exemplary embodiments of the invention are concerned, the timing at which the MAC 30 processes the respective fields of the incoming packet 45 is approximately identical to the timing at which the respective fields are being received by the receiver 16. Accordingly, the packet 45 as shown in FIG. 4 can be considered as representing both the time at which the packet 45 is received by the receiver 16 and the time at which the packet is processed by the MAC 30.

The SIFS slot time can be defined as a time period beginning at a time (t3) when the last symbol or data value in the packet 45 being received reaches the antenna 14 (FIG. 1) from the transmitting device. The SIFS slot time ends at a time period (t4) when the first symbol or data value in a response packet transmitted by the transmitter 16 exits the antenna 14 en route to the device being responded to. The actual time at which the last symbol or data value in the packet 45 being received reaches the antenna is defined as the time at which the entire packet 45 is received by the receiver 16.

At time t2 in FIG. 4, the MAC 30 finishes processing the information in the type/address field 49 (blocks 104, 106 and 108). In the event the packet 45 is of the type which requires a response as is the case in FIG. 4, the MAC 30 substantially immediately provides the sleep/active control signal on line 38 to switch the transmitter 12 from the sleep mode to the active mode (block 112). As represented by the TX Mode waveform in FIG. 4, the circuitry in the transmitter 12 begins to transition from the sleep mode to a stable active mode beginning at time t2. Thereafter, during such time as the remainder of the packet 45 (e.g., the data and CRC fields 50 and 51) is being received and processed by the MAC 30, the transmitter 12 continues to power up from a non-stable state towards a stable state. At time t3 the entire packet 45 has been received and the MAC 30 then provides the RCV/TX control signal on line 36 (FIG. 1) to change the antenna switch 20 from the receiving position to the transmitting position (block 122).

It is also at time t3 that the SIFS slot time begins for initiating a response to the packet 45. If communicating under typical MAC protocols, the SIFS time is equal to 15 $\mu$s, for example. However, as shown in FIG. 4 the transmitter 12 has been powering up from the sleep mode all during such time as the data field 50 was being received and processed. The transmitter circuitry therefore becomes stabilized much earlier than conventional systems and preferably even before. This enables the transmitter 12 to begin transmitting a response (block 124) much earlier and reliably. Thus, even if the time period Tsa required by the transmitter 12 to stabilize from the sleep mode is approximately equal to the SIFS time slot, there is still all or at least a substantial amount of time within the SIFS slot time to initiate the response. The particular value of Tsa will depend on the particular transmitter design, of course. In the preferred embodiment, the timing of the control signal provided on line 38 to power up the transmitter 12 is such that the transmitter circuitry will be stabilized before entering the SIFS window. The type/address field 49 may be located within the initial half of the packet 45 and preferably closer to the front of the packet so as to maximize the available time for the MAC 30 to detect whether the packet requires a response and begin powering up the transmitter 12.

At time t4 the transmitter 12 completes transmission of the response and notifies the MAC 30 of such completion via line 32 (FIG. 1). The MAC 30 in turn switches the transmitter 12 back to the sleep mode via the sleep/active control signal on line 38 and switches the antenna 14 back to the receiving position (block 126). Thereafter, the transmitter 12 returns to the sleep mode as represented by the TX mode waveform in FIG. 4.

Thus, the transceiver 10 of the present invention utilizes a portion of the time spent receiving and processing a packet 45 to power up the transmitter 12 in the event the packet requires a response. This means that the transmitter will stabilize from a sleep mode substantially sooner than in the conventional case where the entire packet is received before powering up the transmitter (i.e., starting at time t3). Accordingly, the present invention can operate at higher data exchange rates while still managing to conserve battery power. If no response is required, the transmitter 12 is not needlessly woken from the sleep mode.

For maximum battery power savings, the embodiment described above with respect to FIGS. 3A and 3B assumes that the packets 45 received by the transceiver 10 are relatively short in length. More specifically, it is assumed that the length of the packet 45 (with respect to time) following the type/address field 49 is shorter than time period Tsa as shown in FIG. 4. If not, the transmitter 12 may remain idle in the fully powered active state for a longer time than necessary waiting for processing of the incoming packet to be completed. Although the transceiver 10 will be fully operational in such case, this can result in an additional power drain on the battery 26. As a practical matter, however, the additional power drain is relatively minimal compared to the overall power savings and circuit simplicity. Thus, the embodiment of FIGS. 3A and 3B is quite suitable.

Figure 5A:
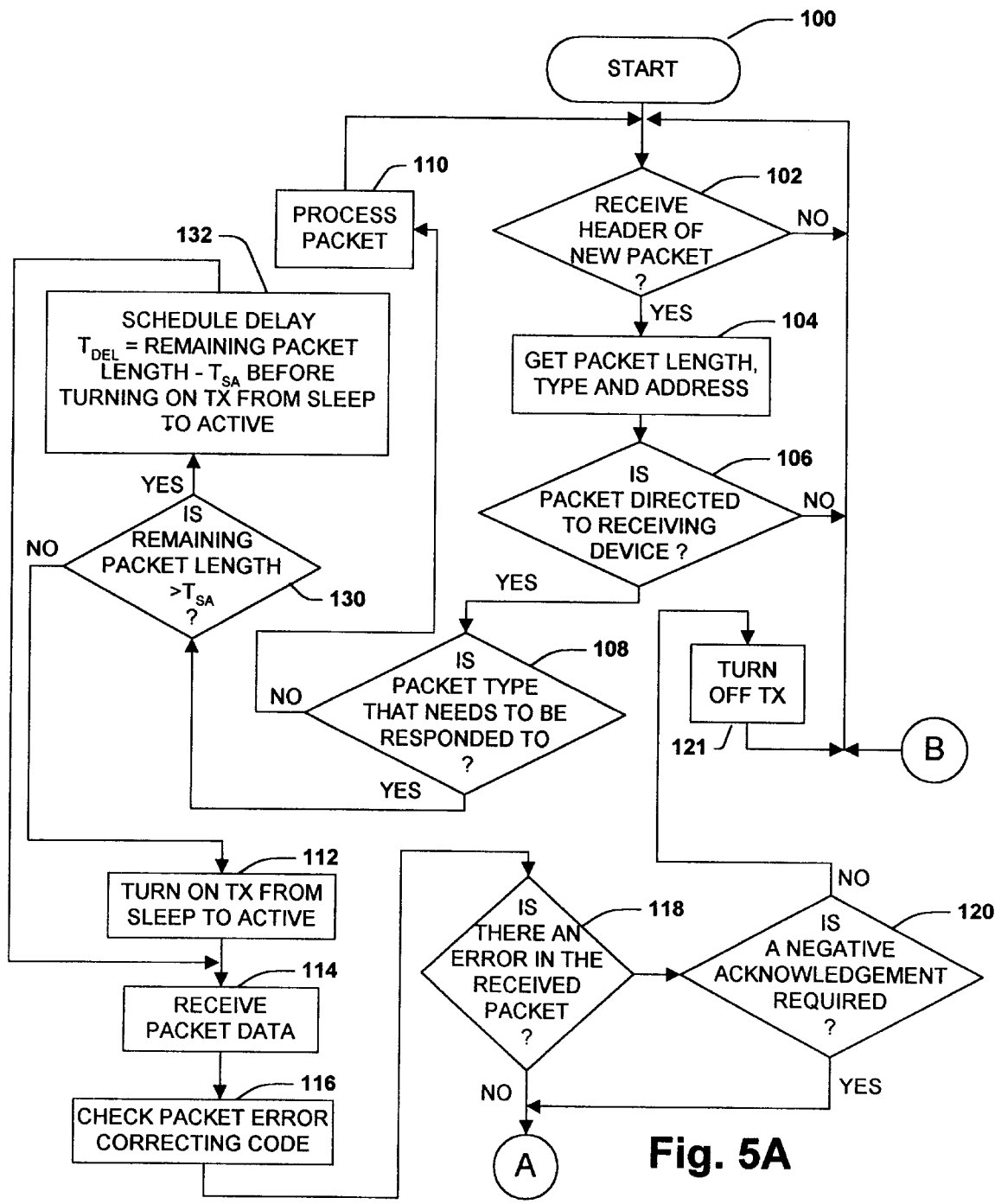
FIGS. 5A and 5B form a flowchart representing the operation of the transceiver control circuit in accordance with a second embodiment of the present invention.
Figure 5B:
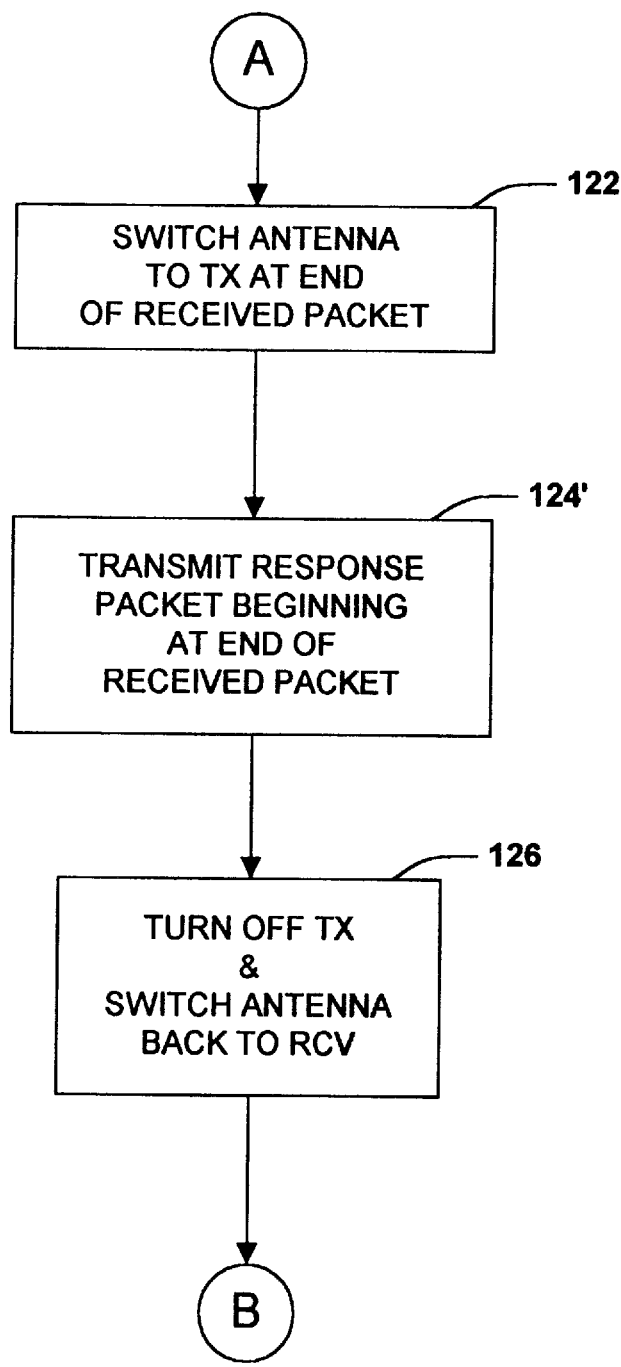

Nevertheless, FIGS. 5A and 5B represent another embodiment of the invention which takes into account the length of each packet 45 as it is received. FIGS. 5A and 5B show a flowchart representing the sequence of operation of the MAC 30 according to such embodiment. The majority of sequence blocks are identical to those discussed above in connection with FIGS. 4A and 4B. Hence, only the differences will be discussed herein to avoid redundancy. In particular, in FIG. 5A, the MAC 30 proceeds from block 108 to block 130 in the event it is determined that the packet is of the type requiring a response. In block 130, the MAC 30 determines if the length of the remainder of the packet 45 following the type/address field 49 is greater with respect to time than the time period Tsa. The MAC 30 can be designed to make such determination based on a knowledge of the packet length as obtained in block 106, the number of bits included within the type/address field 49, the data rate, and the known time period Tsa.

Specifically, the length field 48 in the preferred embodiment includes information relating to the number of bits in the packet 45 following the length field. Such information is obtained by the MAC 30 in block 104 as discussed above. The MAC 30, having processed the type/address field 49, is designed to count the number of bits in the type/address field 49. Then, by subtracting the number of bits in the type/address field 49 from the packet length obtained in block 104, the number of bits remaining in the remainder of the packet (e.g., the data field 50 and CRC field 51) is determined by the MAC 30. Then, by dividing the number of data bits remaining in the packet by the known data rate (in bits per second) of the packet, the remaining length of the packet (Tremainder) in terms of time can be calculated. The MAC 30 can then compare the remaining length to the time period Tsa as represented in block 130.

Figure 6:
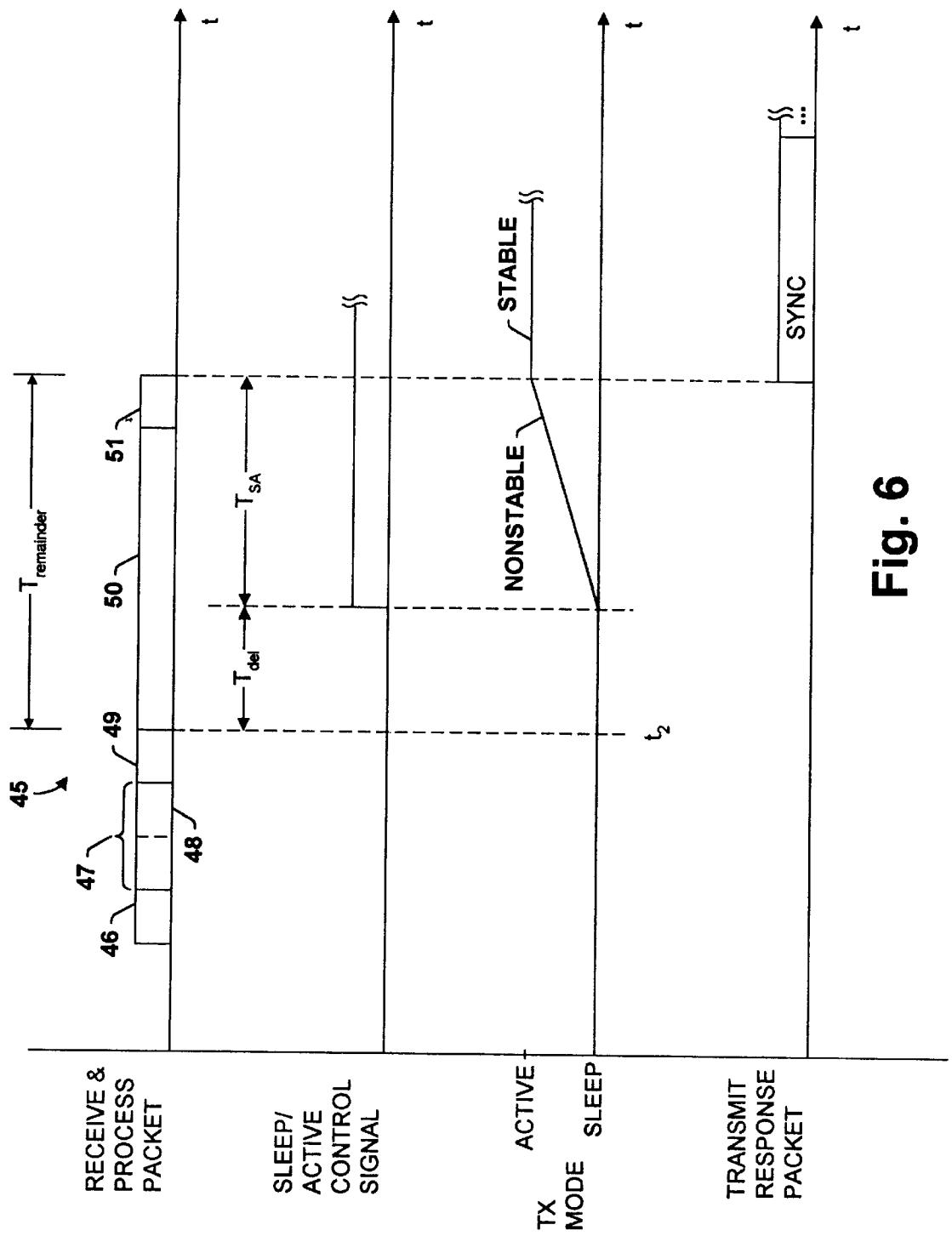
FIG. 6 is a partial timing diagram illustrating operation of the transceiver in accordance with the second embodiment of the present invention.

If the length of the remainder of the packet is not greater than Tsa, the MAC 30 proceeds to block 112 whereby the MAC 30 provides a control signal on line 38 to the transmitter 12 substantially immediately following receipt of the type/address field 49 in order to switch the transmitter from the sleep mode to the active mode. On the other hand, if the length of the remainder of the packet is greater than Tsa, the MAC 30 proceeds to block 132. In block 132, the MAC 30 schedules a delay Tdel for providing the control signal on line 38 to initiate switching the transmitter from the sleep mode to the active mode. Tdel in such case is equal to the length of the remainder of the packet in terms of time minus the time period Tsa. Thereafter, the MAC 30 proceeds directly to block 114. Following block 122, the MAC 30 then goes to block 124' in which the MAC 30 provides a control signal to the transmitter 12 via line 32 instructing the transmitter to begin transmitting at the end of the received packet, e.g., at a time Tdel+Tsa following the end of the type/address field 49. Thus, as represented in FIG. 6, the MAC 30 waits during a delay Tdel before providing the control signal on line 38. This avoids the transmitter 12 remaining idle in a fully powered state for an appreciable amount of time while the remainder of the packet is received.

In each of the above described embodiments, the MAC 30 preferably includes one or more state machines. It will be readily apparent to those having ordinary skill in the art of digital design, based on the disclosure herein, how to design such a state machine or, alternatively, program a microprocessor to carry out the sequence of operation described herein. Such design can be carried out using conventional design and programming techniques without undue effort or experimentation. Hence, further detail is omitted.

Figure 7:
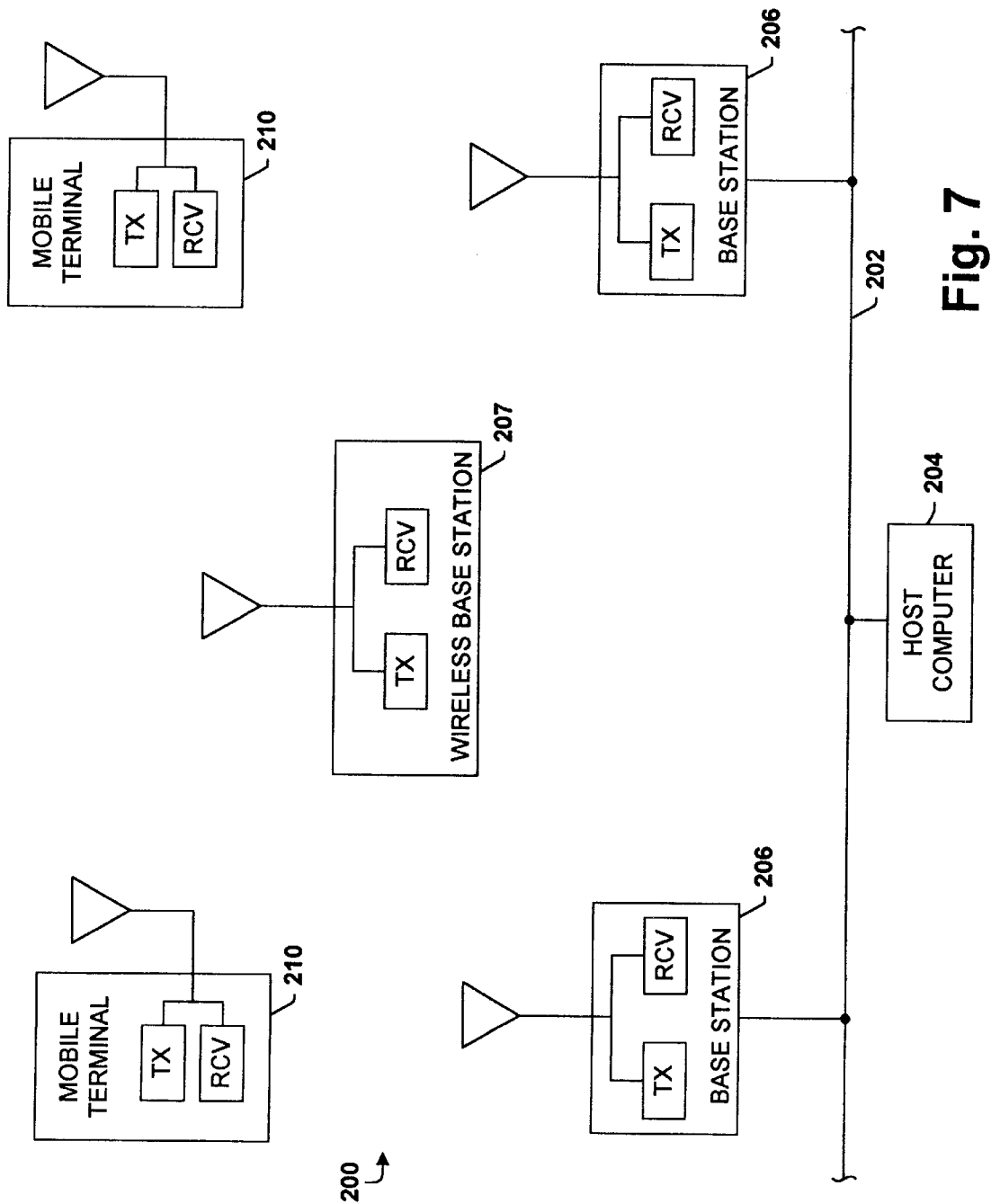
FIG. 7 is a system diagram of a cellular communication system utilizing a plurality of transceivers in accordance with the present invention.

Referring now to FIG. 7, a cellular based wireless communication system in accordance with the present invention is generally designated 200. The system 200 incorporates the above-described principles for controlling the sleep mode operation of a transceiver by way of beginning to power up a transmitter prior to receiving and processing an entire packet. The system 200 includes a hardwired system backbone 202 with a host computer 204 and one or more base stations 206 and wireless base stations 207. The system 200 further includes one or more battery powered mobile terminals 210 which wirelessly communicate with devices on the system backbone 202 via the base stations 206 and/or the wireless base stations 207. More specifically, data is transmitted via radio signals between the mobile terminals 210 and the base stations 206 which are hardwired to the system backbone 202. In this manner, the mobile terminals 210 are able to remain in communication with the system backbone 202 as the mobile terminals 210 roam within the system. The wireless base stations 207 can also be battery powered and serve as repeaters to extend the range of communication as is known.

As is shown in FIG. 7, each of the mobile terminals 210 and base stations 206 and 207 include a transceiver having a transmitter TX and a receiver RCV for wirelessly sending and receiving information via a corresponding antenna. In the preferred embodiment, each of the transceivers in the battery powered mobile terminals 210 and any other battery powered base stations or wireless base stations incorporate a transceiver in accordance with transceiver 10 described above. It is noted that the transceivers need not necessarily be limited to those which are battery powered, as the invention has utility with respect to a transceiver which is powered by any power supply with a limited power source. Based on the present invention, the mobile terminals 210 can transmit and receive data to/from the base stations well within the above-discussed SIFS standard.

In another embodiment of the present invention, the MAC 30 only takes into account the destination address of a packet 45 in determining whether to activate the transmitter 12. This embodiment may be most advantageous in systems where virtually every packet received is of a type which must be responded to by a mobile terminal. Since most packets are of the type which require a response, this embodiment eliminates extra MAC processing beyond determining whether the received packet is addressed to the mobile terminal. In operation, the MAC 30 would process information identical to that described above with reference to FIGS. 3A and 3B except that the MAC 30 would not include the type field in its analysis to determine whether the packet needs to be responded to in step 108.

In yet another embodiment of the present invention, the MAC 30 begins to power up the transmitter as soon as it begins to receive a packet regardless of the type, address or length field. This embodiment may be best suited for systems where each packet typically requires a response and where it is uncommon that a mobile terminal receives a packet which is not addressed to it. Again, the MAC 30 would operate in a manner similar to that described with reference to FIGS. 3A and 3B, with the exception of step 108. Under the present embodiment, step 108 would only be used to determine whether a first symbol or data bit of a packet is received. Upon receiving the beginning of a packet as represented by the packet's first symbol or data bit, the MAC 30 would immediately begin to power up the transmitter 12. Thus, the transmitter 12 would become stabilized prior to the receipt of the entire packet in instances where the transmitter stabilization time Tsa is less than the packet length in terms of time. If, however, the transmitter stabilization time Tsa is typically much shorter then the length of the remaining packet in terms of time then the MAC 30 could be configured to wait either a predetermined or random amount of time after receipt of the first symbol or data bit before turning on the transmitter 12. The predetermined or random amount of time could be determined based on known averages of a given system, for example. Alternatively, similar to the process described above with reference to FIG. 5, the MAC 30 could use the length field to calculate a precise time at which the transmitter 14 begins to power up.

Although the invention has been shown and described with respect to certain preferred embodiments, it is obvious that equivalents and modifications will occur to others skilled in the art upon the reading and understanding of the specification. For example, the present invention has been described with respect to a particular packet format. However, it will be appreciated that the present invention has utility with respect to virtually any format having an indicia of whether the packet requires a response. Furthermore, the MAC 30 is a state machine in the preferred embodiment due to the advantages of high speed operation. However, the control circuit 30 in general may instead be based on a microprocessor or other control device as will be appreciated. In addition, although the invention has been described primarily in the context of a radio transceiver, other types of transceivers such as optical transceivers are considered within the scope of the invention. Finally, although many connections within the transceiver are referred to herein as lines, it will be appreciated that in some cases the lines may in fact represent multiple line (or "bus") connections.

The present invention includes all such equivalents and modifications, and is limited only by the scope of the following claims.

What is claimed is:

1. A transceiver apparatus, comprising:
   a receiver portion for receiving a packet of information, the packet comprising indicia for indicating whether the packet is to be responded to, and the indicia preceding at least one of control information and data also included in the packet;
   a transmitter portion for transmitting information, the transmitter portion being switchable, based on a control input, between a low power consumption mode and an active mode during which information is transmitted; and
   a control circuit coupled to the receiver portion for processing the packet received by the receiver portion to determine whether the packet is to be responded to wherein, prior to the receiver portion receiving the entire packet, the control circuit evaluates the indicia and provides the control input to the transmitter portion to initiate a switch of the transmitter portion from the low power consumption mode to the active mode in the event the packet is to be responded to,
   wherein the packet comprises a length field indicative of the length of the packet, and the control circuit compares the length of the packet to a predetermined criteria in connection with providing the control input to the transmitter portion.

2. The transceiver apparatus of claim 1, wherein the control circuit provides the control input to the transmitter portion prior to processing a substantial portion of the at least one of control information and data succeeding the indicia in the packet.

3. The transceiver apparatus of claim 1, wherein the transmitter portion requires approximately a time period Tsa to transition from the low power consumption mode to the active mode upon receipt of the control input, and wherein the transmitter portion begins transmitting the information less than time period Tsa following receipt of the entire packet by the receiver portion.

4. The transceiver apparatus of claim 1, wherein the indicia precedes data included in the packet.

5. The transceiver apparatus of claim 1, wherein the control circuit comprises a state machine.

6. The transceiver apparatus of claim 1, wherein the control circuit comprises a microprocessor.

7. The transceiver apparatus of claim 1, wherein the control circuit provides the control input to the transmitter portion substantially immediately after processing the indicia in the event a remaining length of the packet in terms of time is not substantially longer than a time period Tsa required by the transmitter portion to transition from the low power consumption mode to the active mode upon receipt of the control input, and delays provision of the control input to the transmitter portion following processing of the indicia in the event the remaining length of the packet in terms of time is substantially longer than Tsa.

8. A method for controlling a transceiver apparatus having a receiver portion for receiving a packet of information, and a transmitter portion for transmitting information, the transmitter portion being switchable, based on a control input, between a low power consumption mode and an active mode during which information is transmitted, the packet comprising indicia for indicating whether the packet is to be responded to, and the indicia preceding at least one of control information and data also included in the packet, the method comprising the steps of:
   receiving the packet via the receiver portion; and
   processing the packet received by the receiver portion by evaluating the indicia and providing the control input to the transmitter portion prior to the receiver portion receiving the entire packet to initiate a switching of the transmitter portion from the low power consumption mode to the active mode in the event the packet is to be responded to, wherein the packet comprises a length field indicative of the length of the packet, and the step of processing comprises the step of comparing the length of the packet to a predetermined criteria in connection with providing the control input to the transmitter portion.

9. The method of claim 8, wherein the control input is provided to the transmitter portion prior to receipt by the receiver portion of a substantial portion of the at least one of control information and data succeeding the indicia in the packet.

10. A cellular communication system, comprising:
a network;
a host computer coupled to the network:
a plurality of base stations coupled to the network and communicating with the host computer, each of the base stations comprising a base station transceiver for transmitting and receiving wireless communications; and
a plurality of mobile terminals each for communicating with the network by way of at least one of the plurality of base stations, each of the plurality of mobile terminals having a mobile terminal transceiver for transmitting and receiving wireless communications with respect to the at least one of the plurality of base stations;
wherein the transceiver of at least one of the mobile terminals comprises:
 a receiver portion for receiving a packet of information, the packet comprising indicia for indicating whether the packet is to be responded to, and the indicia preceding at least one of control information and data also included in the packet;
 a transmitter portion for transmitting information, the transmitter portion being switchable, based on a control input, between a low power consumption mode and an active mode during which information is transmitted; and
 a control circuit coupled to the receiver portion for processing the packet received by the receiver portion to determine whether the packet is to be responded to wherein, prior to the receiver portion receiving the entire packet, the control circuit evaluates the indicia and provides the control input to the transmitter portion to initiate a switch of the transmitter portion from the low power consumption mode to the active mode in the event the packet is to be responded to,
 wherein the packet comprises a length field indicative of the length of the packet, and the control circuit compares the length of the packet to a predetermined criteria in connection with providing the control input to the transmitter portion.

11. The communication system of claim 10, wherein the control circuit provides the control input to the transmitter portion prior to processing a substantial portion of the at least one of control information and data succeeding the indicia in the packet.

12. A cellular communication system, comprising:
a network;
a host computer coupled to the network:
a plurality of base stations coupled to the network and communicating with the host computer, each of the base stations comprising a base station transceiver for transmitting and receiving wireless communications; and
a plurality of mobile terminals each for communicating with the network by way of at least one of the plurality of base stations, each of the plurality of mobile terminals having a mobile terminal transceiver for transmitting and receiving wireless communications with respect to the at least one of the plurality of base stations;
wherein the transceiver of at least one of the base stations comprises:
 a receiver portion for receiving a packet of information, the packet comprising indicia for indicating whether the packet is to be responded to, and the indicia preceding at least one of control information and data also included in the packet;
 a transmitter portion for transmitting information, the transmitter portion being switchable, based on a control input, between a low power consumption mode and an active mode during which information is transmitted; and
 a control circuit coupled to the receiver portion for processing the packet received by the receiver portion to determine whether the packet is to be responded to wherein, prior to the receiver portion receiving the entire packet, the control circuit evaluates the indicia and provides the control input to the transmitter portion to initiate a switch of the transmitter portion from the low power consumption mode to the active mode in the event the packet is to be responded to,
 wherein the packet comprises a length field indicative of the length of the packet, and the control circuit compares the length of the packet to a predetermined criteria in connection with providing the control input to the transmitter portion.

13. A transceiver apparatus, comprising:
a receiver portion for receiving a packet of information;
a transmitter portion for transmitting information, the transmitter portion being switchable, based on a control input, between a low power consumption mode and an active mode during which information is transmitted; and
a control circuit coupled to the receiver portion for processing the packet received by the receiver portion, wherein prior to the receiver portion receiving the entire packet, the control circuit provides a control input to the transmitter portion to initiate a switch of the transmitter portion from the low power consumption mode to the active mode,
wherein the packet comprises a length field indicative of the length of the packet, and the control circuit provides the control input to the transmitter portion substantially immediately after processing the length field in the event a remaining length of the packet in terms of time is not substantially longer than a time period $T_{sa}$ required by the transmitter portion to transition from the low power consumption mode to the active mode upon receipt of the control input, and delays provision of the control input to the transmitter portion following processing of the length field in the event the remaining length of the packet in terms of time is substantially longer than $T_{sa}$.

* * * * *